United States Patent
Stover et al.

(10) Patent No.: US 12,147,122 B2
(45) Date of Patent: Nov. 19, 2024

(54) BACKLIGHT WITH COLLIMATING REFLECTIVE POLARIZER

(71) Applicant: 3M INNOVATIVE PROPERTIES COMPANY, St. Paul, MN (US)

(72) Inventors: Carl A. Stover, St. Paul, MN (US); Matthew E. Sousa, Rosemount, MN (US); Bharat R. Acharya, Woodbury, MN (US); Benjamin J. Forsythe, Stillwater, MN (US); Robert D. Taylor, Stacy, MN (US); Quinn D. Sanford, Mosinee, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/558,425

(22) PCT Filed: May 17, 2022

(86) PCT No.: PCT/IB2022/054584
§ 371 (c)(1),
(2) Date: Nov. 1, 2023

(87) PCT Pub. No.: WO2022/243874
PCT Pub. Date: Nov. 24, 2022

(65) Prior Publication Data
US 2024/0231154 A1  Jul. 11, 2024

Related U.S. Application Data

(60) Provisional application No. 63/191,467, filed on May 21, 2021.

(51) Int. Cl.
*G02F 1/1335* (2006.01)
*G02F 1/1333* (2006.01)
*G02F 1/13357* (2006.01)

(52) U.S. Cl.
CPC ...... *G02F 1/13362* (2013.01); *G02F 1/13338* (2013.01); *G02F 1/133504* (2013.01);
(Continued)

(58) Field of Classification Search
CPC ............. G02F 1/13362; G02F 1/13338; G02F 1/133504; G02F 1/133553; G02F 1/133615; G02B 2203/11
See application file for complete search history.

(56) References Cited

U.S. PATENT DOCUMENTS

| | | | |
|---|---|---|---|
| 8,608,363 B2 | 12/2013 | Weber et al. | |
| 2014/0240981 A1* | 8/2014 | Weber | G02B 6/0096 362/235 |
| 2014/0254125 A1 | 9/2014 | Nevitt et al. | |

FOREIGN PATENT DOCUMENTS

| | | |
|---|---|---|
| EP | 0736196 B1 | 7/2002 |
| WO | 2008144636 A2 | 11/2008 |

(Continued)

OTHER PUBLICATIONS

International Search Report for PCT International Application No. PCT/IB2022/054584, mailed on Aug. 19, 2022, 3 pages.

*Primary Examiner* — Donald L Raleigh
(74) *Attorney, Agent, or Firm* — Jonathan L. Tolstedt

(57) ABSTRACT

A backlight including a front reflector disposed on a back reflector and defining a cavity therebetween. For a visible wavelength range and for a first incident angle of less than 5 degrees, the front reflector has an average transmittance of less than 20% for the incident light polarized along a first direction, and an average transmittance of between 20% and 85% for the incident light polarized along an orthogonal second direction. For a visible wavelength range and for a second incident angle of greater than 40 degrees, the front reflector has an average transmittance of less than 40% for each of the first and second directions. For at least a first
(Continued)

wavelength in an infrared wavelength range, the front reflector has a transmittance of greater than about 40% for each of the first and second incident angles and for each of the first and second directions. For each of the first and second incident angles, for the incident light polarized along each of the first and second directions, the back reflector has a transmittance of greater than 30% for the first infrared wavelength, and an average transmittance of less than 20% in the visible range.

20 Claims, 5 Drawing Sheets

(52) U.S. Cl.
CPC .. *G02F 1/133553* (2013.01); *G02F 1/133615* (2013.01); *G02F 2203/11* (2013.01)

(56) References Cited

FOREIGN PATENT DOCUMENTS

| | | | |
|---|---|---|---|
| WO | 2008144644 | A2 | 11/2008 |
| WO | 2008144656 | A2 | 11/2008 |
| WO | 2009100307 | A1 | 8/2009 |
| WO | 2010062485 | A1 | 6/2010 |

* cited by examiner

BACKLIGHT WITH COLLIMATING REFLECTIVE POLARIZER

CROSS REFERENCE TO RELATED APPLICATIONS

This application is a national stage filing under 35 U.S.C. 371 of PCT/IB2022/054584, filed May 17, 2022, which claims the benefit of U.S. Provisional Application No. 63/191,467, filed May 21, 2021, the disclosures of which are incorporated by reference in their entireties herein.

SUMMARY

In some aspects of the present description, a backlight for providing illumination to a liquid crystal panel is provided, the backlight including a front reflector disposed on a back reflector and defining a cavity therebetween. The cavity is substantially uniformly filled with a material, each of the front and back reflectors includes a plurality of polymeric layers numbering at least 50 in total, and each of the polymeric layers has an average thickness of less than about 500 nm.

For an incident light propagating in an incident plane and a human-visible wavelength range extending from about 420 nm to about 650 nm, and an infrared wavelength range extending from about 900 to about 1500 nm, the front reflector and back reflector have the properties as described below.

For the visible wavelength range and for a first incident angle of less than about 5 degrees, the front reflector has an average transmittance of less than about 20% for the incident light polarized along a first direction, and has an average transmittance of between about 20% and about 85% for the incident light polarized along an orthogonal second direction.

For the visible wavelength range and for a second incident angle of greater than about 40 degrees, the front reflector has an average transmittance of less than about 40% for each of the first and second directions lying in the incident plane and for each of a p-polarized and an s-polarized incident light.

For at least a first wavelength in the infrared wavelength range, the front reflector has a transmittance of greater than about 40% for each of the first and second incident angles, for each of the p-polarized and s-polarized incident lights, and for each of the first and second directions lying in the incident plane.

For each of the first and second incident angles, for the incident light polarized along each of the first and second directions, and for each of the first and second directions lying in the incident plane, the back reflector has a transmittance of greater than about 30% for the at least the first wavelength in the infrared wavelength range, and an average transmittance of less than about 20% in the visible wavelength range.

The material filling the cavity has an index of refraction of less than about 1.2 for at least one wavelength in the visible wavelength range.

In some aspects of the present description, a display system for sensing a finger of a user applied to the display system is provided, the display system including a display panel configured to generate an image for viewing by the user, and an extended light source for providing illumination to the display panel. The extended light source includes spaced-apart substantially co-extensive front and back reflectors for recycling light therebetween to increase a brightness of the illumination. A spacing between the front and back reflectors is substantially, uniformly filled with a material having an effective index of refraction of less than about 1.2.

For a visible wavelength range extending from about 420 nm to about 650 nm and an infrared wavelength range extending from about 900 to about 1500 nm: for a substantially normally incident light and polarization states along mutually orthogonal first and second directions, the front reflector has respective average visible transmittances $T_x$ and $T_y$ in the visible wavelength range and respective transmittances $T_{ix}$ and $T_{iy}$ at at least a first wavelength in the infrared wavelength range, such that $T_{ix}$ and $T_{iy} > T_y > T_x$.

For an incident light having the second polarization state and incident at an incident angle of greater than about 40 degrees, the front reflector has an average visible transmittances $T_{y1}$ in the visible wavelength range, and a transmittance $T_{iy1}$ at the at least first wavelength in the infrared wavelength range, such that $T_{iy1} > T_{y1}$ and $T_y > T_{y1} > T_x$.

For each of p- and s-polarized incident lights and for incident angles at least up to about 50 degrees, the back reflector has a transmittance of greater than about 30% at the at least first wavelength in the infrared wavelength range.

DETAILED DESCRIPTION

Figure 1:
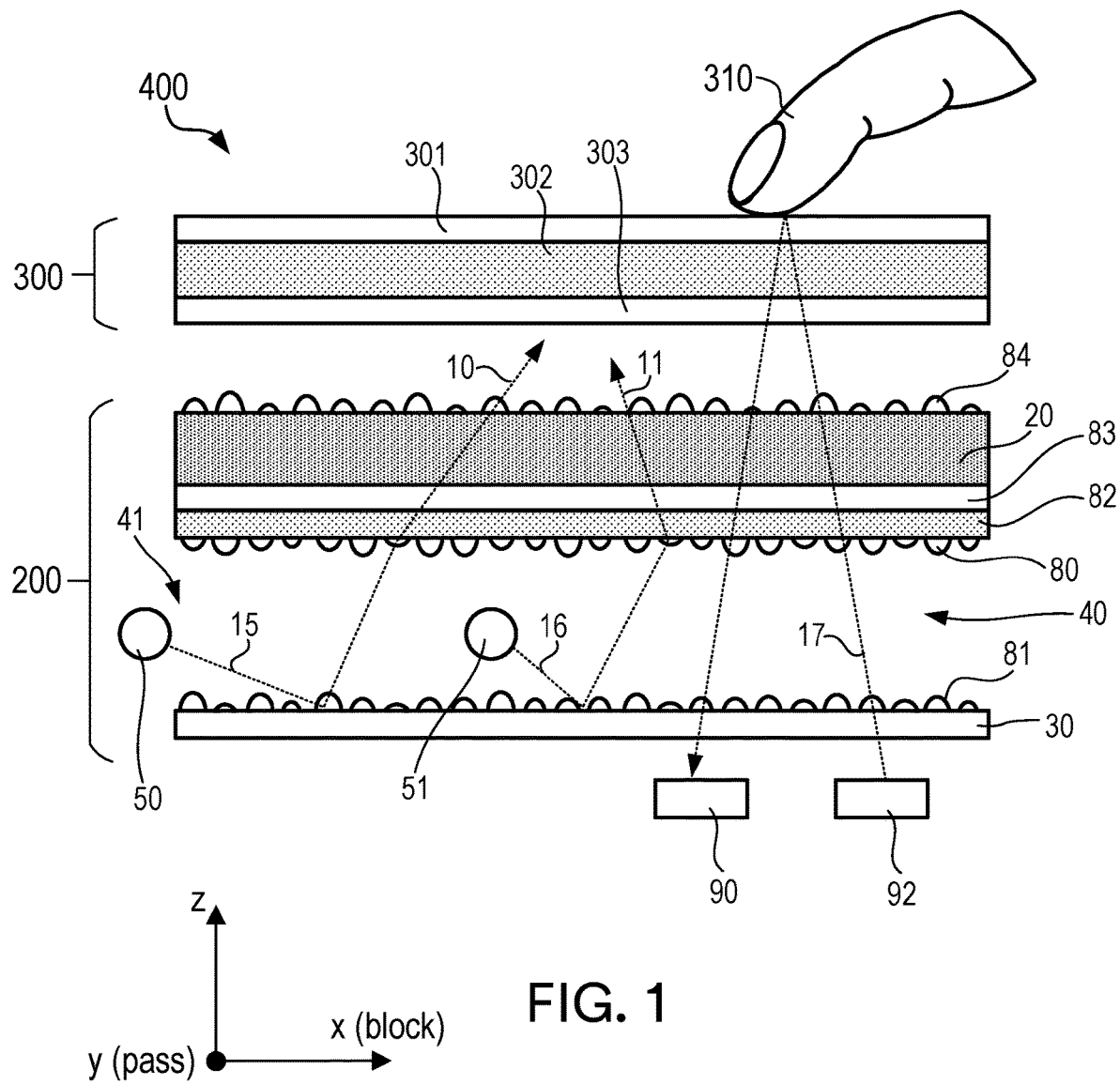
FIG. 1 is a schematic view of a display system for sensing a finger of a user applied to the display system, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A fingerprint reading system where the light source and corresponding light sensor are disposed beneath the display has many advantages for a mobile device such as a smartphone. For example, placing the light and/or sensor beneath the display means that they are not obstructing any part of the active area of the display or the backlight, causing adverse visual effects on the display (e.g., dim areas, non-uniformities, etc.). However, it can be challenging to design a system in which the light from the light source (e.g., one or more wavelengths in an infrared wavelength range) passes up through the various levels of the display (e.g., backlight, light guide, reflectors, and the display itself), bounce off a finger, and pass back through the optical stack and still have a high enough transmission level for the sensor to use for a fingerprint scan.

According to some aspects of the present description, a backlight for providing illumination to a liquid crystal panel is configured to mitigate the loss of infrared light as it passes through the optical stack. In some embodiments, the backlight may include a front reflector disposed on a back reflector and defining a cavity therebetween. In some embodiments, the cavity may be substantially, uniformly filled with a material having an index of refraction of less than about 1.2 for at least one wavelength in a human-visible wavelength range (e.g., the material may be air). In some embodiments, each of the front and back reflectors may include a plurality of polymeric layers numbering at least 50 in total, or at least 100 in total, or at least 150 in total, or at least 200 in total, or at least 250 in total, or at least 300 in total, or at least 350 in total, or at least 400 in total. In some embodiments, each of the polymeric layers may have an average thickness of less than about 500 nm. In some embodiments, at least one of the front reflector and the back reflector may further include at least one skin layer having an average thickness of greater than about 500 nm.

In some embodiments, the liquid crystal panel may include a liquid crystal layer disposed between a first absorbing polarizer and a second absorbing polarizer. In some embodiments, the backlight may further include at least one light source for emitting light into the cavity. In some embodiments, the at least one light source may be disposed outside, and along a lateral side of, the cavity, such that the at least one light source emits light that enters the cavity through the lateral side. In some embodiments, the at least one light source may be disposed inside of the cavity, such that the at least one light source emits light inside the cavity. In some embodiments, at least a first light source may be disposed outside the cavity and at least a second light source may be disposed inside the cavity.

For an incident light propagating in an incident plane and a human-visible (or visible) wavelength range extending from about 420 nm to about 650 nm, and an infrared wavelength range extending from about 900 to about 1500 nm, the front reflector and back reflector have the properties as described herein.

For example, in some embodiments, for the visible wavelength range and for an incident light at a first incident angle of less than about 5 degrees, the front reflector may have an average transmittance of less than about 20%, or less than about 15%, or less than about 10%, or less than about 5%, or less than about 2%, or less than about 1%, or less than about 0.1% for the incident light polarized along a first direction (e.g., in the x-direction), and may have an average transmittance of between a lower range limit of about 20%, or about 25%, or about 30%, or about 35%, or about 40% and an upper range limit of about 85%, or about 80%, or about 75%, or about 70%, or about 65%, or about 60% for the incident light polarized along an orthogonal second direction (e.g., the y-direction).

In some embodiments, for the visible wavelength range and for a second incident angle of greater than about 40 degrees, the front reflector may have an average transmittance of less than about 40%, or less than about 35%, or less than about 30%, or less than about 25% for each of the first and second directions lying in the incident plane and for each of a p-polarized and an s-polarized incident light.

In some embodiments, for at least a first wavelength in the infrared wavelength range, the front reflector may have a transmittance of greater than about 40%, or greater than about 45%, or greater than about 50%, or greater than about 55%, or greater than about 60% for each of the first and second incident angles, for each of the p-polarized and s-polarized incident lights, and for each of the first and second directions lying in the incident plane.

In some embodiments, for each of the first and second incident angles, for the incident light polarized along each of the first and second directions, and for each of the first and second directions lying in the incident plane, the back reflector may have a transmittance of greater than about 30% 30%, or greater than about 35%, or greater than about 40%, or greater than about 45%, or greater than about 50% for the at least the first wavelength in the infrared wavelength range, and an average transmittance of less than about 20%, or less than about 15%, or less than about 10%, or less than about 5%, or less than about 1% in the visible wavelength range.

In some embodiments, either the front reflector or the back reflector, or both, include an optical diffuser disposed thereon, such that the optical diffuser faces the interior of the cavity. In some of these embodiments, the optical diffuser includes a substrate and is bonded to at least one of the front reflector and the back reflector. In other embodiments, the optical diffuser may be disposed directly on at least one of the front reflector and the back reflector. In some embodiments, at least one of the front reflector and the back reflector may include an optical diffuser which is disposed thereon and facing away from the cavity. In some embodiments, any of the optical diffusers described herein may include a plurality of protrusions on a major surface of the optical diffuser. In some embodiments, the plurality of protrusions may form a regular array, or an irregular array, or a substantially random array of protrusions.

According to some aspects of the present description, a display system for sensing a finger of a user applied to the display system includes a display panel configured to generate an image for viewing by the user, and an extended light source for providing illumination to the display panel. In some embodiments, the extended light source may include spaced-apart, substantially co-extensive front and back reflectors for recycling light therebetween to increase a brightness of the illumination. In some embodiments, a spacing between the front and back reflectors is substantially, uniformly filled with a material having an effective index of refraction of less than about 1.2. In some embodiments, for example, the material may be air.

For the following discussion, a visible and infrared wavelength range shall be defined such that the visible wavelength range extends from about 420 nm to about 650 nm and the infrared wavelength range extends from about 900 to about 1500 nm.

In some embodiments, for a substantially normally incident light and polarization states along mutually orthogonal first and second directions, the front reflector may have respective average visible transmittances Tx and Ty in the visible wavelength range and respective transmittances Tix and Tiy at at least a first wavelength in the infrared wavelength range, such that Tix and Tiy>Ty>Tx.

In some embodiments, for an incident light having the second polarization state and incident at an incident angle of greater than about 40 degrees, the front reflector may have an average visible transmittances Ty1 in the visible wavelength range, and a transmittance Tiy1 at the at least first wavelength in the infrared wavelength range, such that Tiy1>Ty1 and Ty>Ty1>Tx. In some embodiments, wherein for each of p-polarized light and s-polarized light incident at an incident angle of greater than about 40 degrees, an average visible transmittance of the front reflector in the visible wavelength range may be smaller than a transmittance of the front reflector for the at least first wavelength in the infrared wavelength range.

In some embodiments, for each of p- and s-polarized incident lights and for incident angles at least up to about 50 degrees, the back reflector may have a transmittance of greater than about 30%, or greater than 35%, or greater than 40%, or greater than 45% at the at least first wavelength in the infrared wavelength range.

In some embodiments, at least one of the front reflector and the back reflector include and optical diffuser disposed on the reflector and facing the spacing.

In some embodiments, the extended light source may further include at least one light source for emitting light into the spacing. In such embodiments, the at least one light source is disposed outside, and along a lateral side, of the spacing, such that it emits light that enters the spacing through the lateral side. In other embodiments, the at least one light source may be disposed inside of the spacing, the at least one light source emitting light inside the spacing.

Turning now to the drawings, FIG. 1 is a schematic view of a display system for sensing a finger of a user applied to the display system, according to the present description. The display system 400 includes a backlight 200 and a liquid crystal panel 300. In some embodiments, the liquid crystal panel 300 may include a liquid crystal layer 302 disposed between a first absorbing polarizer 301 and a second absorbing polarizer 303.

In some embodiments, the backlight 200 may include a front reflector 20 and a rear reflector 30. A spacing or cavity 40 is defined between front reflector 20 and rear reflector 30. In some embodiments, cavity 40 may be substantially uniformly filed with a material. In some embodiments, the material may have an index of refraction of less than about 1.2. In some embodiments, the material may be air.

In some embodiments, backlight 200 may further include an optical diffuser. In some embodiments, front reflector 20 may include optical diffuser 80 disposed thereon and facing cavity 40. In some embodiments, back reflector 30 may include optical diffuser 81 disposed thereon and facing cavity 40. In some embodiments, both front reflector 20 and back reflector 30 may include an optical diffuser 80/81. In some embodiments, the optical diffuser 80 may include a substrate 82 and be connected to the corresponding reflector 20/30 via an adhesive layer 83. That is, although substrate 82 and adhesive layer 83 are shown with optical diffuser 80 in FIG. 1, they may also be used with optical diffuser 81. In other embodiments, optical diffuser 80/81 may be disposed directly on the corresponding reflector 20/30 (shown in FIG. 1 with optical diffuser 81 on back reflector 30.) In some embodiments, at least one of the front reflector 20 or back reflector 30 may include an optical diffuser 84 disposed on a major surface of the reflector facing away from cavity 40. In some embodiments, optical diffuser 80/81/84 may include a plurality of protrusions on a major surface of the corresponding reflector 20/30. In some embodiments, the plurality of protrusions may form a regular array, an irregular array, or a substantially random array of protrusions.

In some embodiments, backlight 200 may further include at least one light source 50/51 for emitting light into cavity 40. In some embodiments, the at least one light source 50 may be disposed outside, and along a lateral side 41 of cavity 40, and emit light 15 that enters cavity 40 through lateral side 41. In some embodiments, the at least one light source 51 may be disposed inside of the cavity and emit light 16 inside the cavity.

In some embodiments, display system 400 may further include at least one infrared light sensor 90 and at least one infrared light source 92. Infrared light source 92 may emit at least one wavelength of infrared light 17 which is substantially transmitted by back reflector 30, front reflector 20, and liquid crystal panel 300, where it is reflected by an object (e.g., the finger of a user 310), passing back through the display system 400 to be detected by infrared light sensor 90.

In some embodiments, front reflector 20 may be a collimating multi-layer optical film which substantially transmits at least one wavelength of infrared light for use by infrared light sensor 60 to read the print of finger 310. In some embodiments, front reflector 20 may substantially reflect one polarization type of visible light (e.g., light aligned to the x, or block axis of the film, as shown in FIG. 1) regardless of angle of incidence and may reflect the orthogonal polarization type of visible light (e.g., light aligned to the y, or pass axis, of the film) more strongly at larger angles than normally incident light. These attributes tend to collimate visible light that is allowed to pass through the reflector without significantly affecting the infrared light used for fingerprint sensing.

In some embodiments, back reflector 30 acts as an infrared-transmissive mirror which is an efficient mirror for visible light at a large range of angles, but which substantially transmissive for at least one wavelength of infrared light. Additional information on the transmission and reflection properties of front reflector 20 and back reflector 30 are provided elsewhere herein.

In some embodiments, one or more optical diffuser 80/81/84 may aid in extracting light from cavity 40 providing illumination 10/11 to liquid crystal panel 300 and may turn light that is traveling laterally toward a direction closer to normal to liquid crystal panel 300.

Figure 2:
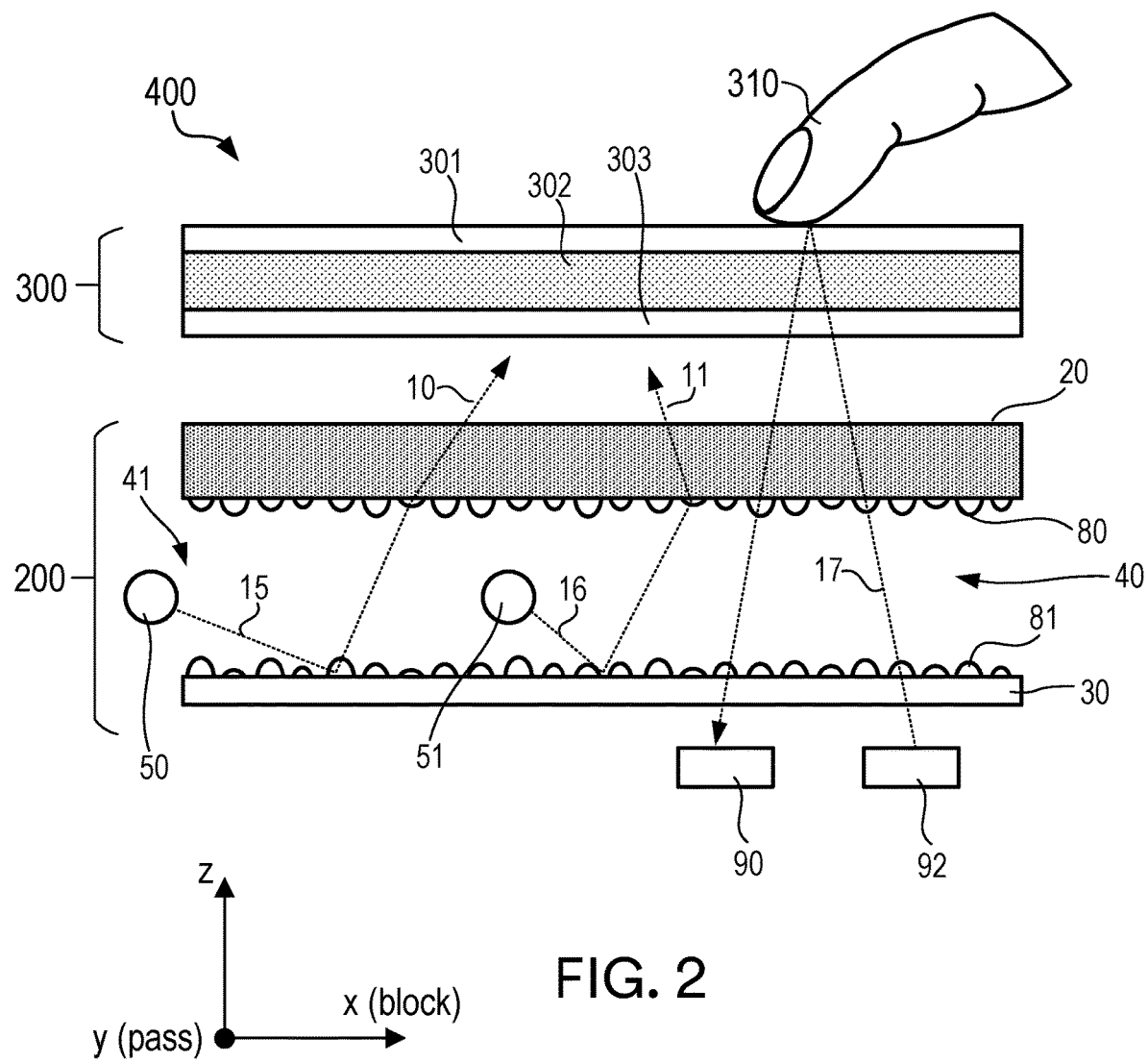
FIG. 2 is a schematic view of a display system for sensing a finger of a user applied to the display system, in accordance with an alternate embodiment of the present description.

FIG. 2 is an alternate and simplified schematic view of the display system 400 of FIG. 1 and is provided for clarity. While FIG. 1 shows several possible configurations (e.g., optical diffuser 84 on front reflector 20, facing away from cavity 40, optical diffuser 80 disposed on substrate 82, etc.). FIG. 2 presents one particular embodiment. In the embodiment shown in FIG. 2, backlight 200 has a first optical diffuser 80 on front reflector 20, facing cavity 40, and a second optical diffuser 81 on back reflector 30, also facing cavity 40. Elements of FIG. 2 sharing reference designators with like-numbered elements in FIG. 1 are assumed to provide a similar function, and the descriptions are not repeated here.

Figure 3:
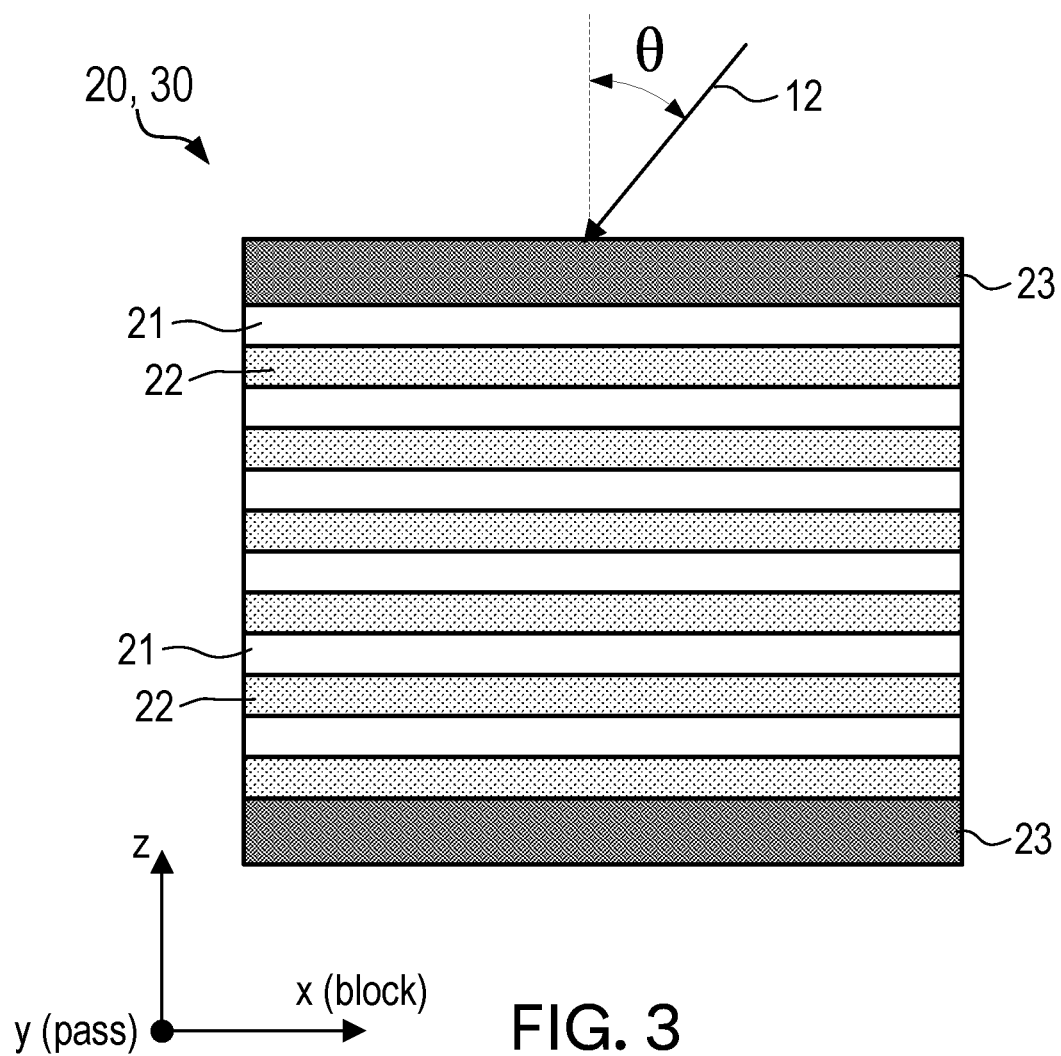
FIG. 3 is an illustration of the layered structure of a multilayer optical film, in accordance with an embodiment of the present description.

FIG. 3 is an illustration of the multilayer structure of one embodiment of front reflector 20 and back reflector 30 of FIGS. 1 and 2. In some embodiments, each of the front and back reflectors include a plurality of alternating polymeric layers 21, 22 numbering at least 50, or at least 100, or at least 150, or at least 200, or at least 250, or at least 300, or at least 350, or at least 400 in total. In some embodiments, each of the polymeric layers 21, 22 may have an average thickness of less than about 500 nm. In some embodiments, at least one of the front reflector and the back reflector may further include at least one skin layer having an average thickness of greater than about 500 nm. The total number, thicknesses, and indices of refraction of alternating polymeric layers 21, 22 of front 20 and back 30 reflectors may be configured such that an incident light 12 propagating in and incident plane (e.g., the x-y plane shown in FIG. 3) at an angle of incidence θ will exhibit properties similar to those shown in the plots of FIGS. 4 and 5.

Figure 4:
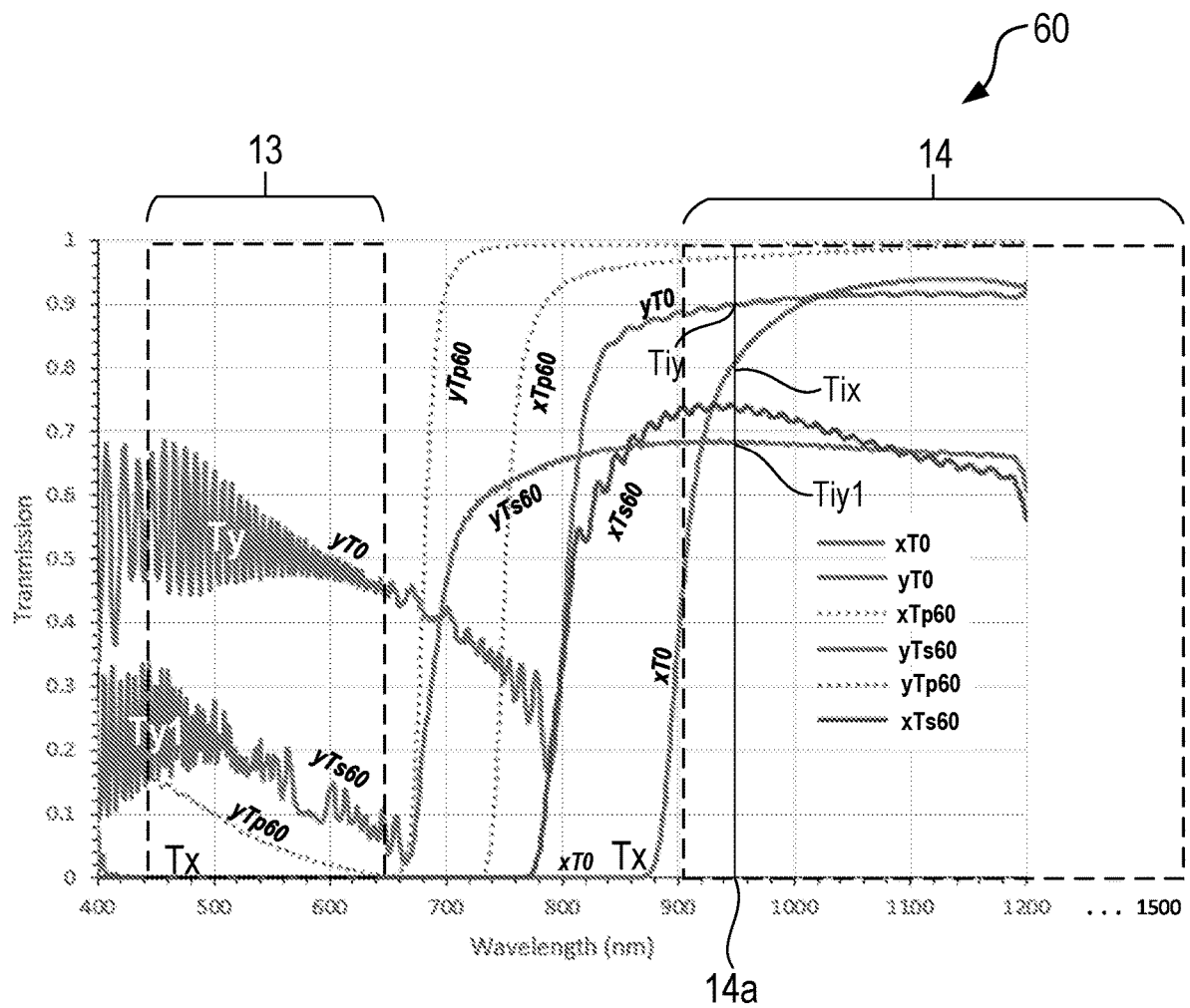
FIG. 4 is a chart showing transmission versus wavelength plots for a first reflector in a display system, in accordance with an embodiment of the present description.

FIG. 4 is a chart showing transmission versus wavelength plots for a first reflector in a display system (such as front reflector 20 of FIG. 1). As described elsewhere herein, in some embodiments, the front reflector may be a collimating multi-layer optical film which substantially transmits at least one wavelength of infrared light for use by an infrared light sensor, may substantially reflect one polarization type of visible light (e.g., light aligned to the x axis) regardless of angle of incidence, and may reflect the orthogonal polarization type of visible light (e.g., light aligned to the y axis) more strongly at larger angles than normally incident light. Example plots representing this embodiment are provided for the front reflector 20 in plot 60 of FIG. 4.

FIG. 4 defines two wavelength ranges indicated by dashed boxes, a visible wavelength range 13 extending from about 420 nm to about 650 nm, and an infrared wavelength range 14 extending from about 900 nm to 1500 nm. It should be noted that plot 60 includes data only up to 1200 nm (appropriate for support of the claims and discussion herein), even though the infrared wavelength range may extend to 1500 nm.

The labels shown on the plotlines of plot 60 shall be interpreted as follows for this discussion (see Table 1). These same definitions shall also apply to FIG. 5 and plot 70, discussed elsewhere herein.

TABLE 1

Label Definitions

| Plotline Label | Description |
| --- | --- |
| xT0 | Light polarized to the x (block) axis with either s- or p-polarization type with an angle of incidence relative to the reflector that is about 0 degrees. |
| yT0 | Light polarized to the y (pass) axis with either s- or p-polarization type with an angle of incidence relative to the reflector that is about 0 degrees. |
| xTp60 | Light polarized to the x (block) axis with a p-polarization type with an angle of incidence relative to the reflector of about 60 degrees. |
| xTs60 | Light polarized to the x (block) axis with an s-polarization type with an angle of incidence relative to the reflector that is about 60 degrees. |
| yTp60 | Light polarized to the y (pass) axis with a p-polarization type with an angle of incidence relative to the reflector that is about 60 degrees. |
| yTs60 | Light polarized to the y (pass) axis with an s-polarization type with an angle of incidence relative to the reflector that is about 60 degrees. |

Looking at plot 60, and the plotlines labeled xT0 and yT0, for light in visible wavelength range 13 at a first incident angle of about 0 degrees (i.e., an incidence angle less than about 5 degrees), the front reflector has an average transmittance, Tx, of less than about 20%, or less than about 15%, or less than about 10%, or less than about 5%, or less than about 2%, or less than about 1%, or less than about 0.1% for the incident light polarized along a first direction (the block, or x-axis), and has an average transmittance, Ty, of between a lower range limit of about 20%, or about 25%, or about 30%, or about 35%, or about 40% and an upper range limit of about 85%, or about 80%, or about 75%, or about 70%, or about 65%, or about 60% for the incident light polarized along an orthogonal second direction (the pass, or y-axis).

For the visible wavelength range 13 and for a second incident angle of about 60 degrees (i.e., greater than about 40 degrees, or about 45 degrees, or about 50 degrees, or about 55 degrees) the front reflector may have an average transmittance of less than about 40%, or less than about 35%, or less than about 30%, or less than about 25% for each of the first and second directions lying in the incident plane and for each of a p-polarized and an s-polarized incident light (see, for example, plotlines xTp60, yTs60, yTp60, and xTx60, which are each below 25% transmittance in plot 60).

For at least a first wavelength 14a in the infrared wavelength range 14, the front reflector has a transmittance of greater than about 40%, or greater than about 45%, or greater than about 50%, or greater than about 55%, or greater than about 60% for each of the first and second incident angles, for each of the p-polarized and s-polarized incident lights, and for each of the first and second directions lying in the incident plane. (see, for example, plotlines xT0, yT0, xTp60, yTs60, yTp60, and xTx60, which each have transmittance levels above 60%).

For a substantially normally incident light and polarization states along mutually orthogonal first (x-axis, block axis) and second (y-axis, pass axis) directions, the front reflector has respective average visible transmittances Tx (on plotline xT0) and Ty (on plotline yT0) in the visible wavelength range 13, and respective transmittances Tix and Tiy at at least a first wavelength 14a in the infrared wavelength range 14, such that Tix and Tiy>Ty>Tx.

For an incident light having the second polarization state and incident at an incident angle of greater than about 40 degrees, or about 45 degrees, or about 50 degrees, or about 55 degrees, or about 60 degrees (see plotline yTs60), the front reflector has an average visible transmittances Ty1 in the visible wavelength range 13, and a transmittance Tiy1 at the at least first wavelength 14a in the infrared wavelength range 14, such that Tiy1>Ty1, and Ty>Ty1>Tx.

Figure 5:
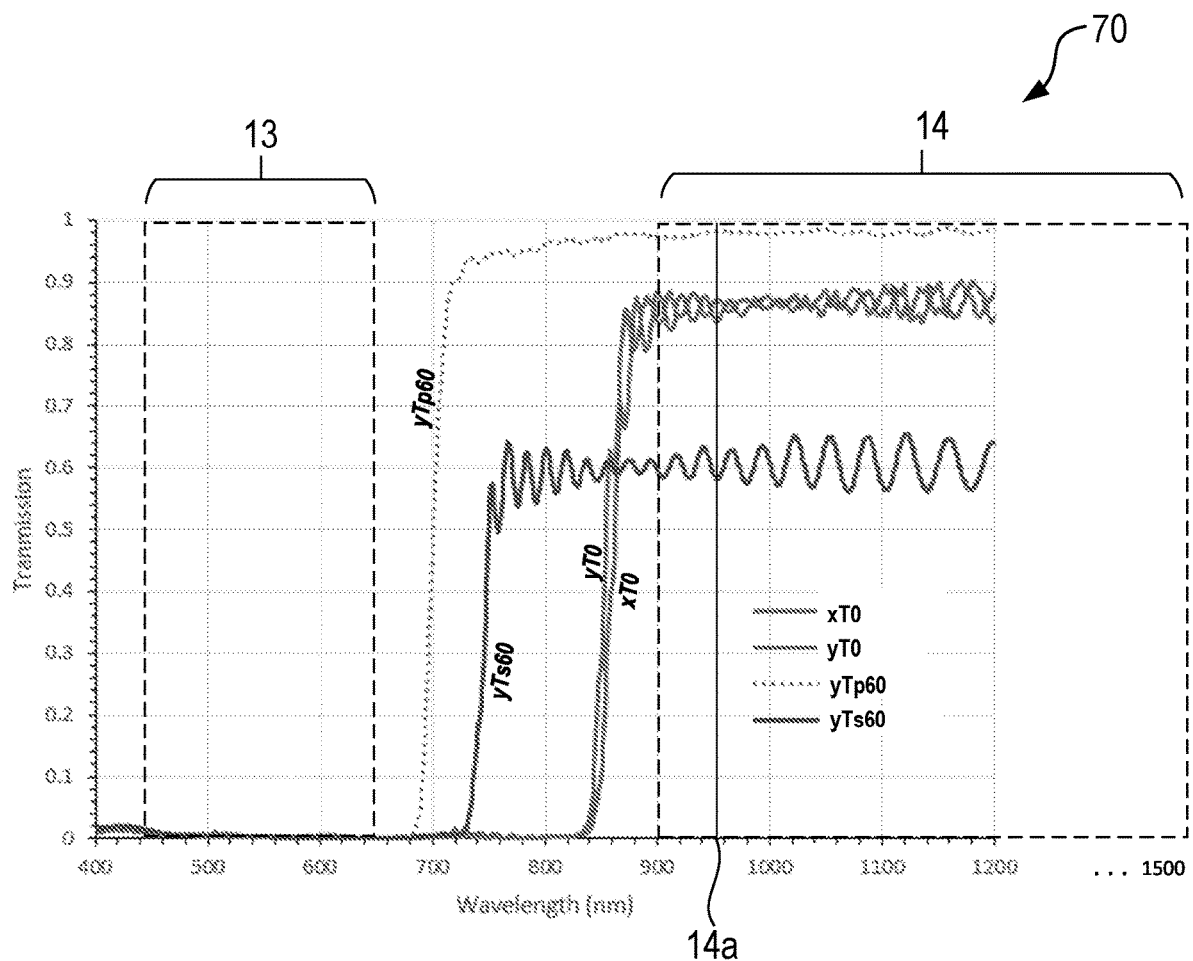
FIG. 5 is a chart showing transmission versus wavelength plots for a second reflector in a display system, in accordance with an embodiment of the present description.

FIG. 5 is a chart showing transmission versus wavelength plots for a second reflector in a display system (such as second reflector 30 of FIG. 1). As described elsewhere herein, in some embodiments, back reflector 30 acts as an infrared-transmissive mirror which is an efficient mirror for visible light at a large range of angles, but which substantially transmissive for at least one wavelength of infrared light.

Example plots representing this embodiment are provided for the back reflector 30 in plot 70 of FIG. 5. Like FIG. 4. FIG. 5 defines two wavelength ranges indicated by dashed boxes, a visible wavelength range 13 extending from about 420 nm to about 650 nm, and an infrared wavelength range 14 extending from about 900 nm to 1500 nm. The labels shown on the plotlines of plot 70 shall be interpreted as described in Table 1. It should be noted that, similar to plot 60, plot 70 includes data only up to 1200 nm (appropriate for support of the claims and discussion herein), even though the infrared wavelength range may extend to 1500 nm.

Looking at plot 70, and the plotlines labeled xT0, yT0, yTs60, and yTp60, for each of the first and second incident angles, for the incident light polarized along each of the first and second directions, and for each of the first and second directions lying in the incident plane, the back reflector has a transmittance of greater than about 30%, or greater than about 35%, or greater than about 40%, or greater than about 45%, or greater than about 50% for the at least first wavelength 14a in the infrared wavelength range 14, and an average transmittance of less than about 20%, or less than about 15%, or less than about 10%, or less than about 5%, or less than about 1% in the visible wavelength range 13.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description. "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description. "substantially equal" will mean about equal where about is as described above. If the use of "substantially parallel" is not otherwise clear to one of ordinary skill in the art in the context in which it is used and described in the present description. "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A backlight for providing illumination to a liquid crystal panel, the backlight comprising a front reflector disposed on a back reflector and defining a cavity therebetween and substantially uniformly filled with a material, each of the front and back reflectors comprising a plurality of polymeric layers numbering at least 50 in total, each of the polymeric layers having an average thickness of less than about 500 nm, such that for an incident light propagating in an incident plane and a visible wavelength range extending from about 420 nm to about 650 nm and an infrared wavelength range extending from about 900 to about 1500 nm:

the front reflector has:
in the visible wavelength range: a first incident angle of less than about 5 degrees, an average transmittance of less than about 20% for the incident light polarized along a first direction, and an average transmittance of between about 20% and about 85% for the incident light polarized along an orthogonal second direction, and for a second incident angle of greater than about 40 degrees, an average transmittance of less than about 40% for each of the first and second directions lying in the incident plane and for each of a p-polarized and an s-polarized incident lights; and for at least a first wavelength in the infrared wavelength range: a transmittance of greater than about 40% for each of the first and second incident angles, for each of the p-polarized and an s-polarized incident lights, and for each of the first and second directions lying in the incident plane; and the back reflector has:
for each of the first and second incident angles, for the incident light polarized along each of the first and second directions, and for each of the first and second directions lying in the incident plane, a transmittance of greater than about 30% for the at least the first wavelength in the infrared wavelength range, and an average transmittance of less than about 20% in the visible wavelength range;

wherein the material has an index of refraction of less than about 1.2 for at least one wavelength in the visible wavelength range.

2. The backlight of claim 1, wherein at least one of the front and back reflectors comprises an optical diffuser disposed thereon and facing the cavity.

3. The backlight of claim 2, wherein the optical diffuser comprises a substrate and is bonded to the at least one of the front and back reflectors via an adhesive layer.

4. The backlight of claim 2, wherein the optical diffuser is disposed directly on the at least one of the front and back reflectors.

5. The backlight of claim 1, wherein at least one of the front and back reflectors comprises an optical diffuser disposed thereon and facing away from the cavity.

6. The backlight of any of claims 2-5, wherein the optical diffuser comprises a plurality of protrusions on a major surface thereof.

7. The backlight of any of claim 6, wherein the protrusions in the plurality of protrusions form a regular array, an irregular array, or a substantially random array of protrusions.

8. The backlight of claim 1, wherein the liquid crystal panel comprises a liquid crystal layer disposed between first and second absorbing polarizers.

9. The backlight of claim 1 further comprising at least one light source for emitting light into the cavity.

10. The backlight of claim 9, wherein the at least one light source is disposed outside, and along a lateral side, of the cavity, the at least one light source emitting light that enters the cavity through the lateral side.

11. The backlight of claim 9, wherein the at least one light source is disposed inside of the cavity, the at least one light source emitting light inside the cavity.

12. The backlight of claim 1, wherein at least one of the front and back reflectors further comprises at least one skin layer having an average thickness of greater than about 500 nm.

13. The backlight of claim 1, wherein the material is air.

14. A display system for sensing a finger of a user applied to the display system, the display system comprising:
- a display panel configured to generate an image for viewing by the user; and
- an extended light source for providing illumination to the display panel, the extended light source comprising spaced apart substantially co-extensive front and back reflectors for recycling light therebetween to increase a brightness of the illumination, a spacing between the front and back reflectors substantially uniformly filled with a material having an effective index of refraction of less than about 1.2, such that for a visible wavelength range extending from about 420 nm to about 650 nm and an infrared wavelength range extending from about 900 to about 1500 nm:
- for a substantially normally incident light and polarization states along mutually orthogonal first and second directions, the front reflector has respective average visible transmittances $Tx$ and $Ty$ in the visible wavelength range and respective transmittances $Tix$ and $Tiy$ at at least a first wavelength in the infrared wavelength range, $Tix$ and $Tiy > Ty > Tx$;
- for an incident light having the second polarization state and incident at an incident angle of greater than about 40 degrees, the front reflector has an average visible transmittances $Ty1$ in the visible wavelength range, and a transmittance $Tiy1$ at the at least first wavelength in the infrared wavelength range, $Tiy1 > Ty1$, and $Ty > Ty1 > Tx$; and
- for each of p- and s-polarized incident lights and for incident angles at least up to about 50 degrees, the back reflector has a transmittance of greater than about 30% at the at least first wavelength in the infrared wavelength range.

15. The display system of claim 14, wherein for each of p- and s-polarized light incident at an incident angle of greater than about 40 degrees, an average visible transmittance of the front reflector in the visible wavelength range is smaller than a transmittance of the front reflector for the at least first wavelength in the infrared wavelength range.

16. The display system of claim 14, wherein the material is air.

17. The display system of claim 14, wherein at least one of the front and back reflectors comprises an optical diffuser disposed thereon and facing the spacing.

18. The display system of claim 14, wherein the extended light source further comprises at least one light source for emitting light into the spacing.

19. The display system of claim 18, wherein the at least one light source is disposed outside, and along a lateral side, of the spacing, the at least one light source emitting light that enters the spacing through the lateral side.

20. The display system of claim 18, wherein the at least one light source is disposed inside of the spacing, the at least one light source emitting light inside the spacing.

* * * * *